United States Patent
Bradley et al.

(10) Patent No.: US 12,205,213 B2
(45) Date of Patent: Jan. 21, 2025

(54) SYNTHESIZING SEQUENCES OF IMAGES FOR MOVEMENT-BASED PERFORMANCE

(71) Applicants: DISNEY ENTERPRISES, INC., Burbank, CA (US); ETH Zürich (Eidgenössische Technische Hochschule Zürich), Zürich (CH)

(72) Inventors: Derek Edward Bradley, Zurich (CH); Prashanth Chandran, Zurich (CH); Paulo Fabiano Urnau Gotardo, Zurich (CH); Gaspard Zoss, Zurich (CH)

(73) Assignees: Disney Enterprises, INC., Burbank, CA (US); ETH Zürich (Eidgenössische Technische Hochschule Zürich), Zürich (CH)

( * ) Notice: Subject to any disclaimer, the term of this patent is extended or adjusted under 35 U.S.C. 154(b) by 32 days.

(21) Appl. No.: 17/526,647

(22) Filed: Nov. 15, 2021

(65) Prior Publication Data

US 2023/0154090 A1    May 18, 2023

(51) Int. Cl.
*G06T 13/40* (2011.01)
*G06N 3/08* (2023.01)
(Continued)

(52) U.S. Cl.
CPC ............... *G06T 13/40* (2013.01); *G06N 3/08* (2013.01); *G06T 7/215* (2017.01); *G06T 13/80* (2013.01);
(Continued)

(58) Field of Classification Search
CPC ......... G06T 13/40; G06T 7/215; G06T 13/80; G06T 15/04; G06T 17/20; G06T 19/20;
(Continued)

(56) References Cited

U.S. PATENT DOCUMENTS 10,719,742 B2    7/2020   Shechtman et al.
10,762,337 B2    9/2020   Sharma et al.
(Continued)

FOREIGN PATENT DOCUMENTS

WO    2020/117657 A1    6/2020
WO    2020256471 A1    12/2020
(Continued)

OTHER PUBLICATIONS

Karras et al., "Audio-Driven Facial Animation by Joint End-to-End Learning of Pose and Emotion", ACM Transactions on Graphics, DOI: http://dx.doi.org/10.1145/3072959.3073658, vol. 36, No. 4, Article 94, Jul. 2017, pp. 94:1-94:12.
(Continued)

*Primary Examiner* — Michael Le
(74) *Attorney, Agent, or Firm* — Squire Patton Boggs LLP; Sarah Mirza

(57) ABSTRACT

A technique for rendering an input geometry includes generating a first segmentation mask for a first input geometry and a first set of texture maps associated with one or more portions of the first input geometry. The technique also includes generating, via one or more neural networks, a first set of neural textures for the one or more portions of the first input geometry. The technique further includes rendering a first image corresponding to the first input geometry based on the first segmentation mask, the first set of texture maps, and the first set of neural textures.

20 Claims, 10 Drawing Sheets

(51) Int. Cl.
*G06T 7/215* (2017.01)
*G06T 13/80* (2011.01)
*G06T 15/04* (2011.01)
*G06T 17/20* (2006.01)
*G06T 19/20* (2011.01)

(52) U.S. Cl.
CPC .............. *G06T 15/04* (2013.01); *G06T 17/20* (2013.01); *G06T 19/20* (2013.01); *G06T 2207/20081* (2013.01); *G06T 2207/20084* (2013.01); *G06T 2207/30201* (2013.01); *G06T 2219/2021* (2013.01)

(58) Field of Classification Search
CPC . G06T 2207/20081; G06T 2207/20084; G06T 2207/30201; G06T 2219/2021; G06T 7/21; G06N 3/08; G06N 3/088; G06N 3/045; G06N 3/047; G06N 3/084
See application file for complete search history.

(56) References Cited

U.S. PATENT DOCUMENTS

| | | | |
|---|---|---|---|
| 11,373,352 | B1* | 6/2022 | Gafni ........................ G06T 11/60 |
| 2010/0321386 | A1 | 12/2010 | Lin et al. |
| 2012/0229463 | A1 | 9/2012 | Yeh et al. |
| 2012/0231886 | A1 | 9/2012 | Gomez et al. |
| 2016/0065497 | A1 | 3/2016 | Cole et al. |
| 2017/0213112 | A1* | 7/2017 | Sachs ........................ G06N 3/045 |
| 2018/0030084 | A1 | 10/2018 | Feng et al. |
| 2018/0300842 | A1 | 10/2018 | Feng et al. |
| 2018/0374242 | A1* | 12/2018 | Li ............................ G06T 15/04 |
| 2019/0035149 | A1* | 1/2019 | Chen ..................... G06V 40/166 |
| 2019/0017190 | A1 | 6/2019 | Salavon |
| 2019/0171908 | A1* | 6/2019 | Salavon ................. G06V 10/82 |
| 2020/0143171 | A1* | 5/2020 | Lee ........................ G06V 20/49 |
| 2020/0265567 | A1 | 8/2020 | Hu et al. |
| 2020/0302029 | A1 | 9/2020 | Holm et al. |
| 2021/0049468 | A1 | 2/2021 | Karras et al. |
| 2021/0232803 | A1 | 7/2021 | Fu et al. |
| 2022/0014723 | A1* | 1/2022 | Pandey ................. G06V 10/462 |
| 2022/0036626 | A1* | 2/2022 | Vo ........................... G06N 3/006 |
| 2022/0051485 | A1* | 2/2022 | Martin Brualla ..... G06T 15/506 |
| 2022/0121876 | A1* | 4/2022 | Kalarot .................... G06T 5/20 |
| 2022/0130111 | A1* | 4/2022 | Martin Brualla ....... G06T 15/04 |
| 2022/0180602 | A1* | 6/2022 | Hao ....................... G06V 20/70 |
| 2022/0188696 | A1 | 6/2022 | Yang et al. |
| 2023/0062924 | A1* | 3/2023 | Henley ................. G06V 10/82 |
| 2023/0077187 | A1 | 3/2023 | Zafeiriou et al. |

FOREIGN PATENT DOCUMENTS

| | | |
|---|---|---|
| WO | 2021/096192 A1 | 5/2021 |
| WO | 2021145862 A1 | 7/2021 |

OTHER PUBLICATIONS

Taylor et al., "A Deep Learning Approach for Generalized Speech Animation", ACM Transactions on Graphics, DOI: 10.1145/3072959.3073699, vol. 36, No. 4, Article 93, Jul. 2017, pp. 93:1-93:11.
Holden et al., "Learned Motion Matching", ACM Transactions on Graphics, https://doi.org/10.1145/3386569.3392440, vol. 39, No. 4, Article 53, Jul. 2020, pp. 53:1-53:13.
Harvey et al., "Robust Motion In-betweening", ACM Transactions on Graphics, https://doi.org/10.1145/3386569.3392480, vol. 39, No. 4, Article 60, Jul. 2020, pp. 60:1-60:12.
Zoss et al., "Data-driven Extraction and Composition of Secondary Dynamics in Facial Performance Capture", ACM Transactions on Graphics, https://doi.org/10.1145/3386569.3392463, vol. 39, No. 4, Article 1, Jul. 2020, pp. 1:1-1:10.
Pons-Moll et al., "Dyna: A Model of Dynamic Human Shape in Motion", ACM Transactions on Graphics, DOI: http://dx.doi.org/10.1145/2766993, vol. 34, No. 4, Article 120, Aug. 2015, pp. 120:1-120:14.
Santesteban et al., "SoftSMPL: Data-driven Modeling of Nonlinear Soft-tissue Dynamics for Parametric Humans", EUROGRAPHICS 2020, vol. 39, No. 2, Apr. 1, 2020, 11 pages.
Vaswani et al., "Attention is All You Need", 31st Conference on Neural Information Processing Systems, arXiv:1706.03762, Dec. 6, 2017, p. 1-15.
Shaw et al., "Self-Attention with Relative Position Representations", arXiv:1803.02155, Apr. 12, 2018, 5 pages.
Jiang et al., "TransGAN: Two Pure Transformers Can Make One Strong GAN, and That Can Scale Up", arXiv:2102.07074, Jun. 14, 2021, p. 1-19.
Esser et al., "Taming Transformers for High-Resolution Image Synthesis", arXiv:2012.09841, Jun. 23, 2021, pp. 1-52.
Karras et al., "Analyzing and Improving the Image Quality of StyleGAN", arXiv:1912.04958, Mar. 23, 2020, pp. 1-21.
Gecer et al., "Synthesizing Coupled 3D Face Modalities by Trunk-Branch Generative Adversarial Networks", arXiv:1909.02215, Dec. 2, 2020, pp. 1-19.
Richardson et al., "Encoding in Style: a StyleGAN Encoder for Image-to-Image Translation", arXiv:2008.00951, Apr. 21, 2021, 21 pages.
Park et al., "Semantic Image Synthesis with Spatially-Adaptive Normalization", arXiv:1903.07291, Nov. 5, 2019, pp. 1-19.
Zhu et al., "SEAN: Image Synthesis with Semantic Region-Adaptive Normalization", arXiv:1911.12861, May 24, 2020, 19 pages.
Petrov et al., "DeepFaceLab: Integrated, flexible and extensible face-swapping framework", arxiv:2005.05535, Jun. 29, 2021, pp. 1-10.
Naruniec et al., "High-Resolution Neural Face Swapping for Visual Effects", Eurographics Symposium on Rendering 2020, vol. 39, No. 4, 2020, 16 pages.
Gafni et al., "Dynamic Neural Radiance Fields for Monocular 4D Facial Avatar Reconstruction", arXiv:2012.03065, Dec. 5, 2020, pp. 1-11.
Huang et al., "Music Transformer: Generating Music with Long-Term Structure", arXiv:1809.04281, Dec. 12, 2018, pp. 1-14.
Wang et al., "Video-to-Video Synthesis", arXiv:1808.06601, Dec. 3, 2018, pp. 1-14.
Karras et al., "Alias-Free Generative Adversarial Networks", 35th Conference on Neural Information Processing Systems, arXiv:2106.12423, Oct. 18, 2021, pp. 1-31.
Turkoglu et al., "A Layer-Based Sequential Framework for Scene Generation with GANs", AAAI 2019, arXiv:1902.00671, 2019, 9 pages.
Wang et al., "Generative Image Modeling Using Style and Structure Adversarial Networks", European Conference on Computer Vision, https://link.springer.com/chapter/10.1007 /978-3-319-46493-0 20, 2016, pp. 318-335.
GB Combined Search and Examination Report for Application No. 2217056.7 dated May 16, 2023.
Regateiro et al., "Dynamic Surface Animation using Generative Networks", International Conference on 3D Vision, DOI 10.1109/3DV.2019.00049, 2019, pp. 376-385.
Non Final Office Action received for U.S. Appl. No. 17/526,608 dated Jul. 28, 2023, 31 pages.
Phi, Michael, "Illustrated Guide to Transformers—Step by Step Explanation", Towards Data Science, Apr. 30, 2020, 29 pages.
Final Office Action received for U.S. Appl. No. 17/526,608, dated Nov. 16, 2023, 19 pages.
Non-final Office Action received for U.S. Appl. No. 17/526,608, dated Feb. 29, 2024, 24 pages.
Canadian Office Action, Application Serial No. 3,180,427, dated Apr. 26, 2024, 9 pages.
Phi, Michael, "Illustrated Guide to Transformers—Step by Step Explanation", Towards Data Science, Apr. 30, 2020, 31 pages. https://towardsdatascience.com/illustrated-guide-to-transformers-step-by-step-explanation-f74876522bc0.
Final Office Action received for U.S. Appl. No. 17/669,053 dated Apr. 25, 2024, 26 pages.
New Zealand Examination Report for NZ Application Serial No. 794049, dated May 8, 2024, 3 pages.

(56) References Cited

OTHER PUBLICATIONS

Great Britain Examination Report, Application No. GB2217056.7, dated Apr. 25, 2024, 4 pages.
Regateiro, Joao et al., "Dynamic Surface Animation using Generative Networks", 2019 International Conference on 3D Vision (3DV), 2019, p. 376-385.
Australian Examination Report No. 2, Application No. 2022263508, dated Mar. 26, 2024, 3 pages.
Final Office Action received for U.S. Appl. No. 17/526,608, dated Sep. 20, 2024, 25 pages.

* cited by examiner

SYNTHESIZING SEQUENCES OF IMAGES FOR MOVEMENT-BASED PERFORMANCE

BACKGROUND

Field of the Various Embodiments

Embodiments of the present disclosure relate generally to machine learning and animation and, more specifically, to synthesizing sequences of images for movement-based performance.

Description of the Related Art

Realistic digital faces are required for various computer graphics and computer vision applications. For example, digital faces are oftentimes used in virtual scenes of film or television productions and in video games.

To capture photorealistic faces, a typical facial capture system employs a specialized light stage and hundreds of lights that are used to capture numerous images of an individual face under multiple illumination conditions. The facial capture system additionally employs multiple calibrated camera views, uniform or controlled patterned lighting, and a controlled setting in which the face can be guided into different expressions to capture images of individual faces. These images can then be used to determine three-dimensional (3D) geometry and appearance maps that are needed to synthesize digital versions of the faces.

Machine learning models have also been developed to synthesize digital faces. These machine learning models can include a large number of tunable parameters and thus require a large amount and variety of data to train. However, collecting training data for these machine learning models can be time- and resource-intensive. For example, a deep neural network could be trained to perform 3D reconstruction or animation of a face, given various images captured under uncontrolled "in the wild" conditions that can include arbitrary human identity, facial expression, point of view, and/or lighting environment. To adequately train the deep neural network for the 3D reconstruction task, the training dataset for the deep neural network must include images that represent all possible variations of the input into the deep neural network. Each training sample would additionally include a 3D scan of the corresponding face, which the deep neural network learns to generate based on one or more images of the face in the training sample. However, because face capture systems are limited to scanning a small number of people in controlled studio-like settings, generating a large number of 3D face scans would be intractable. Consequently, the deep neural network is trained using a relatively small number of training samples, which can adversely affect the ability of the deep neural network to generalize to new data and/or adequately learn the relationship between input images of faces and output meshes or animations of the same faces.

As the foregoing illustrates, what is needed in the art are more effective techniques for generating digital faces using machine learning models.

SUMMARY

One embodiment of the present invention sets forth a technique for rendering an input geometry. The technique includes generating a first segmentation mask for a first input geometry and a first set of texture maps associated with one or more portions of the first input geometry. The technique also includes generating, via one or more neural networks, a first set of neural textures for the one or more portions of the first input geometry. The technique further includes rendering a first image corresponding to the first input geometry based on the first segmentation mask, the first set of texture maps, and the first set of neural textures.

One technical advantage of the disclosed techniques relative to the prior art is that one or more components of a realistic performance can be generated by a machine learning model that is trained using synthetic data. Accordingly, the disclosed techniques avoid time and resource overhead involved in collecting or capturing "real world" training data for machine learning models that generate sequences of geometries or images of entities based on input images of the same entities. Another technical advantage of the disclosed techniques is the generation of more realistic movement-based performances, compared with conventional approaches that use machine learning models to generate individual "static" representations of faces or other entities. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

System Overview

Figure 1:
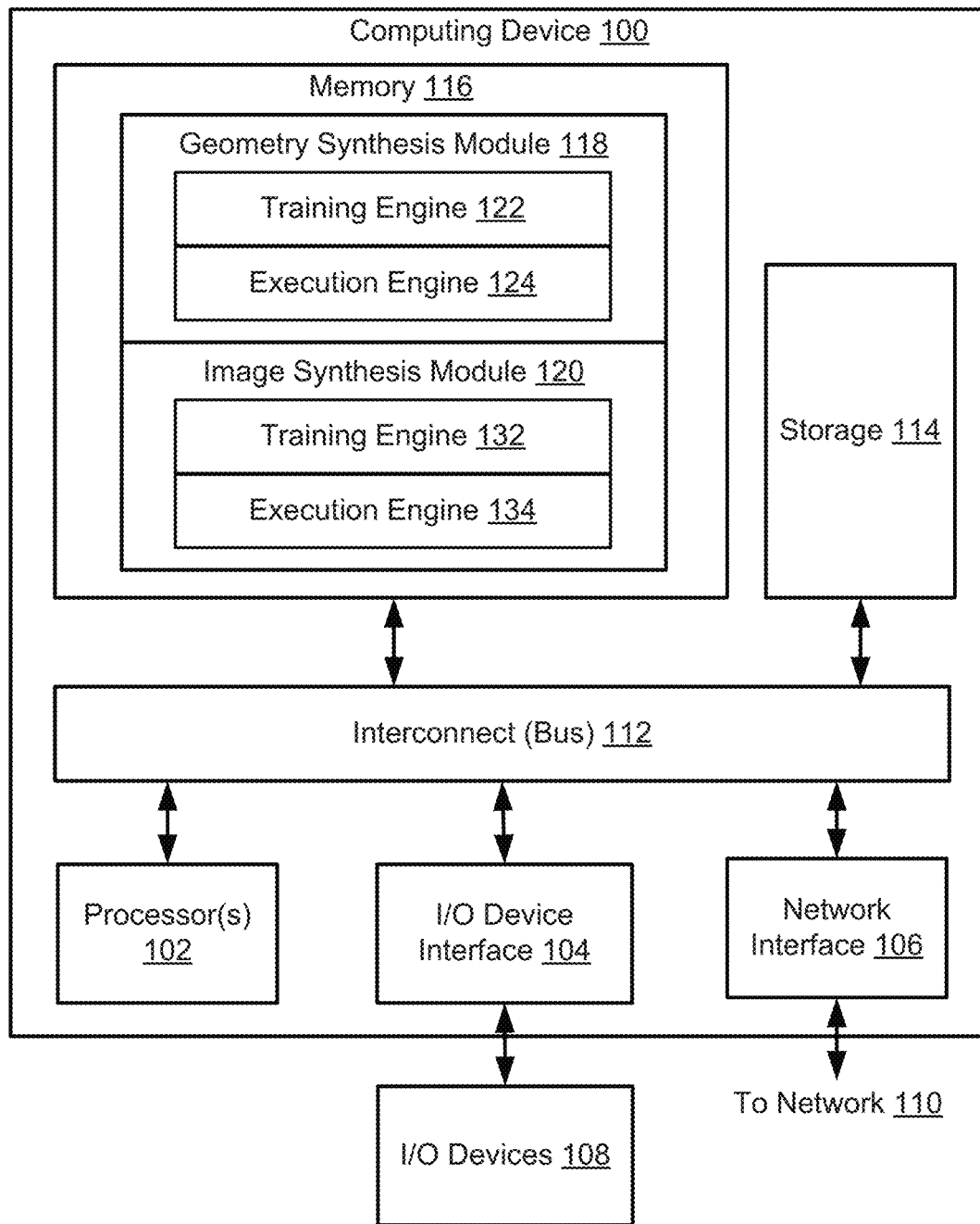
FIG. 1 illustrates a computer system configured to implement one or more aspects of various embodiments.

FIG. 1 illustrates a computing device 100 configured to implement one or more aspects of various embodiments. In one embodiment, computing device 100 may be a desktop computer, a laptop computer, a smart phone, a personal digital assistant (PDA), tablet computer, or any other type of computing device configured to receive input, process data, and optionally display images, and is suitable for practicing one or more embodiments. Computing device 100 is configured to run a geometry synthesis module 118 and an image synthesis module 120 that reside in a memory 116. Within memory 116, geometry synthesis module 118 includes a training engine 122 and an execution engine 124, and image synthesis module 120 similarly includes a training engine 132 and an execution engine 134.

It is noted that the computing device described herein is illustrative and that any other technically feasible configurations fall within the scope of the present disclosure. For example, multiple instances of geometry synthesis module 118, image synthesis module 120, training engine 122, execution engine 124, training engine 132, and/or execution engine 124 could execute on a set of nodes in a distributed system to implement the functionality of computing device 100.

In one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and a network interface 106. Processor(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

Network 110 is any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

Storage 114 includes non-volatile storage for applications and data, and may include fixed or removable disk drives, flash memory devices, and CD-ROM, DVD-ROM, Blu-Ray, HD-DVD, or other magnetic, optical, or solid state storage devices. Geometry synthesis module 118 and image synthesis module 120 may be stored in storage 114 and loaded into memory 116 when executed.

Memory 116 includes a random access memory (RAM) module, a flash memory unit, or any other type of memory unit or combination thereof. Processor(s) 102, I/O device interface 104, and network interface 106 are configured to read data from and write data to memory 116. Memory 116 includes various software programs that can be executed by processor(s) 102 and application data associated with said software programs, including geometry synthesis module 118 and image synthesis module 120.

In some embodiments, geometry synthesis module 118 trains and executes a machine learning model that generates a sequence of three-dimensional (3D) geometries corresponding to a movement-based performance involving a sequence of frames (e.g., an animation). The geometries can be encoded in any form in which animations are typically encoded (e.g., as 3D triangle or quad meshes, or as parameters of a parametric model like blendshape models). The machine learning model includes a transformer-based neural network that generates the sequence of geometries, given an input that includes one or more input geometries that correspond to keyframes within the performance. The operation of geometry synthesis module 118 is described in further detail below with respect to FIGS. 2-4.

In some embodiments, image synthesis module 120 trains and executes one or more machine learning models that generate images corresponding to sequences of 3D geometries outputted by geometry synthesis module 118 (or another component). These machine learning model(s) include generative neural networks, image-to-image translation networks, and/or other types of neural networks that generate individual frames in a performance, given input that includes representations of the corresponding 3D geometries and/or styles that control the identities or appearances of the 3D geometries within the performance. The operation of image synthesis module 120 is described in further detail below with respect to FIGS. 5-9.

Synthesizing Sequences of 3D Geometries

Figure 2:
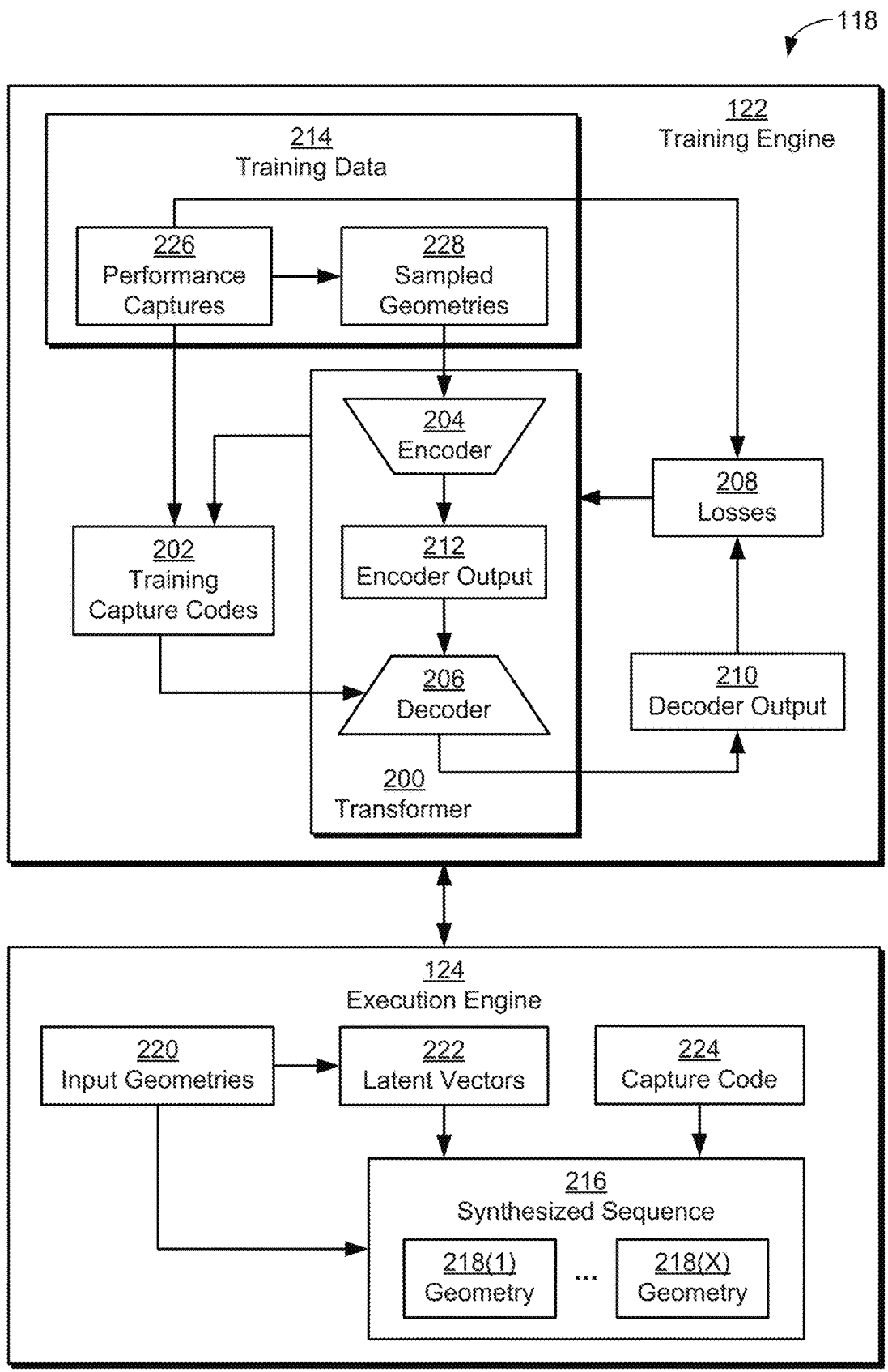
FIG. 2 is a more detailed illustration of the geometry synthesis module of FIG. 1, according to various embodiments.

FIG. 2 is a more detailed illustration of geometry synthesis module 118 of FIG. 1, according to various embodiments. As mentioned above, geometry synthesis module 118 is configured to train and execute a transformer 200 that generates a synthesized sequence 216 of geometries 218(1)-218(X) corresponding to a sequence of frames within a performance, where X is an integer greater than one. For example, geometry synthesis module 118 could use transformer 200 to generate a sequence of geometries 218(1)-218(X) that represent facial expressions, walking, dancing, running, and/or other movements to be depicted in the performance. Each of geometries 218(1)-218(X) is referred to individually as geometry 218.

In one or more embodiments, synthesized sequence 216 outputted by transformer 200 includes a sequence of 3D meshes, blendshape coefficients that parameterize a 3D mesh, and/or other representations of a 3D model to be rendered in the performance. Each geometry 218 included in synthesized sequence 216 can be used to render a corresponding frame (i.e., a still image) in the performance. Thus, X geometries 218 in synthesized sequence 216 could be used to generate a performance that includes X corresponding frames. Alternatively or additionally, a performance that includes more than X frames could be generated from N geometries 218 (where N is a positive integer that is less than X) by interpolating between some or all geometries 218 in synthesized sequence 216.

As shown in FIG. 2, transformer 200 includes an encoder 204 and a decoder 206. In various embodiments, encoder 204 and decoder 206 are implemented as neural networks. Input into transformer 200 includes one or more input geometries 220 that correspond to one or more keyframes in the animation. In some embodiments, a keyframe refers to a frame that defines a starting, ending, or another point of a movement-based transition (e.g., a change in facial expression, mouth shape, movement, etc.) within the animation. Thus, the animation can be generated by "filling in" frames before, after, or between the keyframes in a way that renders the corresponding transitions. Encoder 204 converts input geometries 220 into one or more corresponding latent vectors 222 in a lower-dimensional space. Decoder 206 uses latent vectors 222 and a capture code 224 that represents the content, style, character identity, or semantics of the performance to generate synthesized sequence 216. Synthesized sequence 216 includes input geometries 220, as well as additional geometries 218 that correspond to other frames in the performance.

Figure 3:
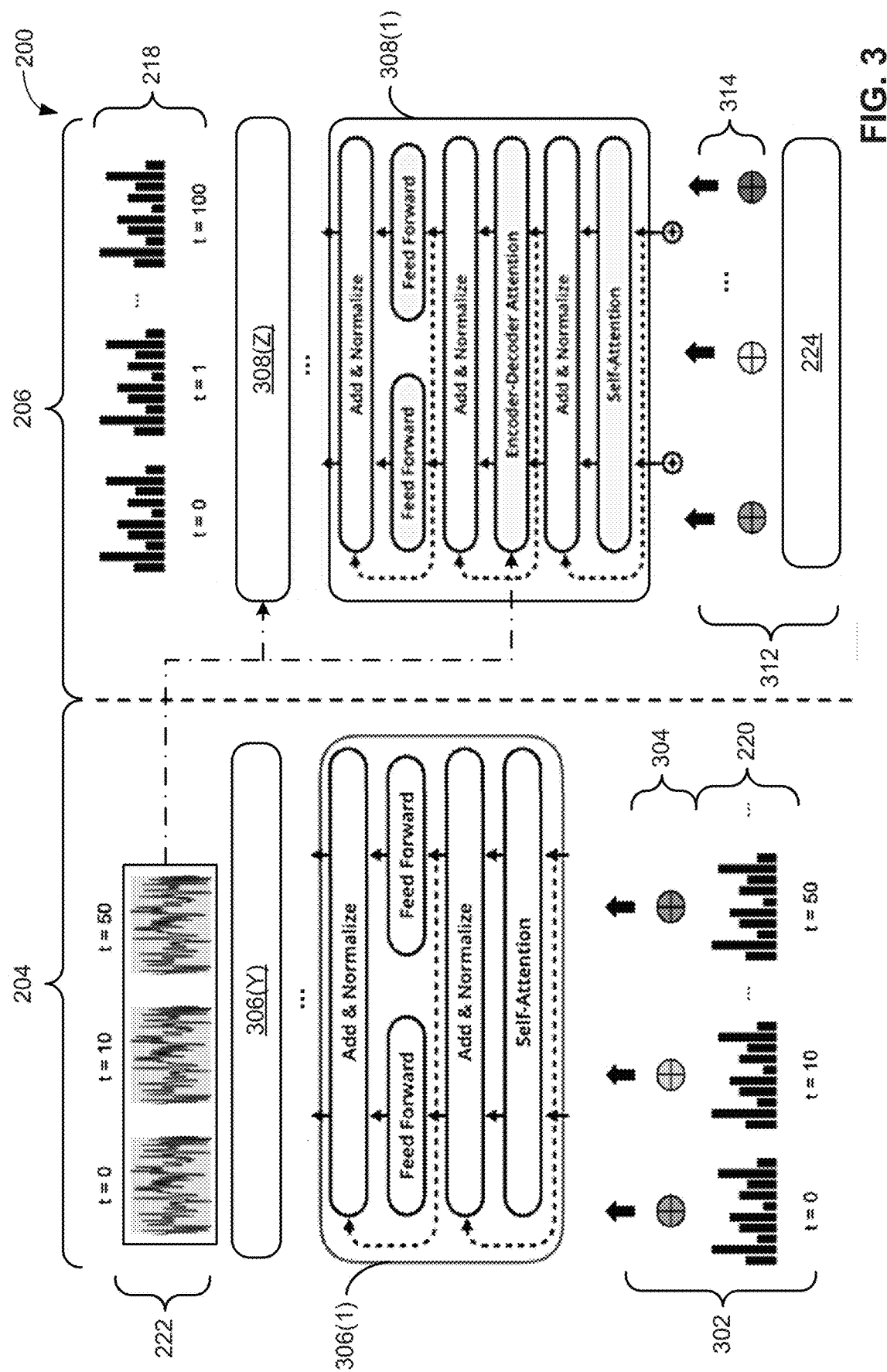
FIG. 3 illustrates an exemplar architecture for the transformer of FIG. 2, according to various embodiments.

FIG. 3 illustrates an exemplar architecture for transformer 200 of FIG. 2, according to various embodiments. As shown in FIG. 3, encoder 204 includes a series of encoder blocks 306(1)-306(Y) with the same structure and different weights, where Y is an integer greater than one. Each of encoder blocks 306(1)-306(Y) is referred to individually as encoder block 306. Each encoder block 306 includes two distinct components. The first component includes a self-attention layer, and the second component includes a position-wise feed-forward neural network that is applied separately and identically to each of input geometries 220. Both the self-attention layer and the feed-forward neural network include a residual connection and an add and normalize layer. Thus, the output of either component can be denoted as LayerNorm(x+Component(x)), where x represents the input into the component and Component(x) is the function implemented by the component (i.e., self-attention or feed-forward neural network).

In some embodiments, input 302 into encoder 204 includes position-encoded representations of a number of input geometries 220. In various embodiments, these position-encoded representations are generated by combining input geometries 220 with position encodings 304 that represent the positions of the corresponding frames within the animation. For example, input 302 could be generated by adding a "positional encoding" that represents the position (e.g., frame number, time step, etc.) of each input geometry within a performance to a mesh, a set of blendshape weights, an embedding, and/or another representation of the input geometry. The positional encoding could have the same dimension as the embedding or representation of the input geometry, and each dimension of the positional encoding could correspond to a sinusoid. In the example illustrated in FIG. 3, three input geometries 220 corresponding to time steps 0, 10, and 50 could be summed with position encodings that represent the positions of 0, 10, and 50, respectively, to generate input into encoder 204.

Input 302 is processed sequentially by encoder blocks 306(1)-306(Y), so that the output of a given encoder block is used as input into the next encoder block. The output of the last encoder block 306(Y) includes a number of latent vectors 222, with each latent vector representing a corresponding input geometry included in input geometries 220.

More specifically, the self-attention layer in each encoder block 306 performs relation-aware self-attention that considers pairwise relationships between elements in input 302. For example, the self-attention layer could use two "relative position representation" vectors denoted by $a_{ij}^K$ and $a_{ij}^V$ (where K is a key matrix and V is a value matrix) to model the relative distance between the positions i and j of each pair of elements in input 302, up to an absolute distance k. The self-attention layer thus learns up to 2k+1 values (k positions prior to a given position, k positions following the given position, and the given position) for each of $a_{ij}^K$ and $a_{ij}^V$ and uses the following equations to determine the relative position representation from position i to position j:

$$a_{ij}^K = w_{clip(j-i,k)}^K \quad (1)$$

$$a_{ij}^V = w_{clip(j-i,k)}^V \quad (2)$$

$$clip(x,k) = \max(-k, \min(k,x)) \quad (3)$$

The self-attention layer then uses the $a_{ij}^K$ and $a_{ij}^V$ vectors to modify the output produced by the self-attention layer from the input element at the ith position.

For example, with three input geometries 220 corresponding to time steps 0, 10, and 50 and a maximum absolute distance k=40, the self-attention layer could learn relative position representations $w^K=(w_{-40}^K, \ldots, w_{40}^K)$ and $w^V=(w_{-40}^V, \ldots, w_{40}^V)$. The self-attention layer could then use $w_{10}^K$ and $w_{10}^V$ to model the relative distance from the first input to the second input and use $w_{-10}^K$ and $w_{-10}^V$ to model the relative distance from the second input to the first input. The self-attention layer could also use $w_{40}^K$ and $w_{40}^V$ to model the relative distance from the second input to the third input and use $w_{-40}^K$ and $w_{-40}^V$ to model the relative distance from the third input to the second input. Because the distance between the first and third inputs exceeds the maximum threshold of k=40, the self-attention layer could omit the use of relative position representations between the first and third inputs.

After latent vectors 222 are generated as the output of the last encoder block 306(Y) in encoder 204, decoder 206 is used to generate a full synthesized sequence 216 of geometries that includes input geometries 220. As shown in FIG. 3, input 312 into decoder 206 includes a position-encoded capture code 224. As mentioned above, capture code 224 encodes the content, speed, context, semantics, identity, and/or other aspects of synthesized sequence 216. For example, capture code 224 includes a "d-dimensional" vector that represents an actor, speaking style, speed, semantics, or other attributes of a facial or full-body performance from which synthesized sequence 216 is to be generated. In various embodiments, this vector is obtained as an embedding from one or more layers of encoder 204 and/or decoder 206 and/or from an external source.

Different capture codes can additionally represent discrete "performances" that can be used to influence the generation of synthesized sequence 216. For example, 100 different capture codes could be generated from 100 performances in training data 214 for transformer 200. To generate synthesized sequence 216 in the "style" (e.g., content, speed, context, semantics, identity, and/or other aspects encoded in capture code 224) of a given performance, capture code 224 for the performance could be provided as input into decoder 206. Alternatively, a new capture code could be generated by interpolating between two or more capture codes. This new capture code would represent a "blending" of the content, style, and/or other attributes of two or more performances in training data 214 that are represented by the two or more capture codes.

As with input 302 into encoder 204, input 312 into decoder 206 includes position-encoded representations of capture code 224. These position-encoded representations can be generated by combining capture code 224 with position encodings 314 that represent the positions of individual frames within the performance. For example, input 312 could be generated by adding, to capture code 224, a positional encoding that represents the position (e.g., frame number, time step, etc.) of each frame in the performance. The positional encoding could have the same dimension as capture code 224, and each dimension of the positional encoding could correspond to a sinusoid. Thus, in the example illustrated in FIG. 3, input 312 could include 101 position-encoded capture codes that represent time steps that range from 0 to 100 in the performance.

Like encoder 204, decoder 206 includes a series of decoder blocks 308(1)-308(Z) with the same structure and different weights, where Z is an integer greater than one. Each of decoder blocks 308(1)-308(Z) is referred to individually as decoder block 308. Each decoder block 308 includes three distinct components. The first component is a self-attention layer, which can perform relation-aware self-attention as described above. The second component is an encoder-decoder attention layer. The third component is a position-wise feed-forward neural network that is applied separately and identically to each component of input 312. All three components in each decoder block 308 include a residual connection and an add and normalize layer. Thus, the output of each component can be denoted as Component (y+Sublayer(y)), where y represents the input into the component and Component(y) is the function implemented by the component.

In one or more embodiments, the encoder-decoder attention layer of each decoder block 308 combines latent vectors 222 outputted by encoder 204 with the output of the self-attention layer in the same decoder block. For example, the encoder-decoder attention layer could fuse keys and values corresponding to latent vectors 222 with queries from the self-attention layer of the same decoder block to model temporal dependencies across the input geometries 220 and the queries.

Input 312 is processed sequentially by decoder blocks 308(1)-308(Z), so that the output of a given decoder block is used as input into the next decoder block. The output of the last decoder block 308(Z) includes synthesized sequence 216. For example, synthesized sequence 216 could include 101 meshes, sets of blendshape coefficients, sets of 3D points, and/or other representations of 3D geometries to be rendered in 101 corresponding frames within the animation.

In addition, 3D geometries in synthesized sequence 216 can be represented the same way as input geometries 220 or differently from input geometries 220. For example, both input geometries 220 and synthesized sequence 216 could include blendshape coefficients that represent facial features or expressions at different time steps in the animation. Each time step in synthesized sequence 216 for which an input geometry was provided could include the same blendshape coefficients as the input geometry. In another example, input geometries 220 could be specified as one or more sets of blendshape coefficients, and output geometries in synthesized sequence 216 could include 3D polygon meshes of the corresponding faces. In this example, each time step in synthesized sequence 216 for which an input geometry was provided could include a face mesh that includes facial features or an expression represented by the blendshape coefficients in the input geometry.

Returning to the discussion of FIG. 2, training engine 122 trains transformer 200 using training data 214 that includes performance captures 226 and sampled geometries 228 from performance captures 226. Performance captures 226 include 3D representations of movements that are related to synthesized sequences to be generated by transformer 200. For example, performance captures 226 could include sequences of blendshape coefficients, 3D meshes, and/or other geometric representations of facial performances, dances, or other types of movements.

Sampled geometries 228 include 3D representations associated with certain time steps in performance captures 226. For example, sampled geometries 228 could include geometries associated with randomly selected and/or fixed time steps within performance captures 226.

During training of transformer 200, training engine 122 inputs one or more sampled geometries 228 from a given performance capture selected from performance captures 226 in training data 214 into encoder 204 to generate encoder output 212 that includes latent vectors 222 corresponding to sampled geometries 228. Training engine 122 inputs encoder output 212 and a training capture code (e.g., training capture codes 202) for the performance capture into decoder 206 and uses decoder 206 to generate decoder output 210 that includes a corresponding synthesized sequence 216. Training engine 122 then calculates one or more losses 208 based on differences between synthesized sequence 216 and the performance capture. Training engine 122 also uses a training technique (e.g., gradient descent and backpropagation) to iteratively update weights of encoder 204 and decoder 206 in a way that reduces subsequent losses 208 between performance captures 226 in training data 214 and the corresponding synthesized sequences outputted by transformer 200.

In some embodiments, training engine 122 creates and/or trains transformer 200 according to one or more hyperparameters. In some embodiments, hyperparameters define higher-level properties of transformer 200 and/or are used to control the training of transformer 200. For example, hyperparameters that affect the structure of transformer 200 could include (but are not limited to) the number of encoder blocks 306 in encoder 204, the number of decoder blocks 308 in decoder 206, the dimensionality of the feed-forward layers in encoder blocks 306 and/or decoder blocks 308, and/or the dimensionality of latent vectors 222. In another example, training engine 122 could select between fully supervised training of transformer 200 using training data 214 and training transformer 200 in an adversarial fashion using a transformer-based discriminator based on one or more hyperparameters that specify a training technique for transformer 200. In a third example, training engine 122 could train transformer 200 based on a batch size, learning rate, number of iterations, and/or another hyperparameter that controls the way in which weights in transformer 200 are updated during training.

After training engine 122 has completed training of transformer 200, execution engine 124 can execute the trained transformer 200 to produce synthesized sequence 216 from a given set of input geometries 220. For example, execution engine 124 could obtain input geometries 220 and capture code 224 (or a selection of a performance corresponding to capture code 224) from a visual effects artist and/or another user involved in generating a performance. Next, execution engine 124 could use encoder 204 to convert input geometries 220 into latent vectors 222. Execution engine 124 could then use decoder 206 to generate multiple geometries 218(1)-218(X) in synthesized sequence 216 from latent vectors 222 and capture code 224.

After a given synthesized sequence 216 is produced by transformer 200, execution engine 124 and/or another component can provide synthesized sequence 216 for use in generating other types of output. For example, execution engine 124 could provide synthesized sequence 216 to image synthesis module 120 to allow image synthesize module 120 to render a performance that includes images corresponding to geometries 218 in synthesized sequence 216. Rendering of images from geometries 218 is described in further detail with respect to FIGS. 5-9. In another example, execution engine 124 could add input geometries 220 and/or synthesized sequence 216 to training data 214 and/or another training dataset for transformer 200 and/or another machine learning model.

Figure 4:
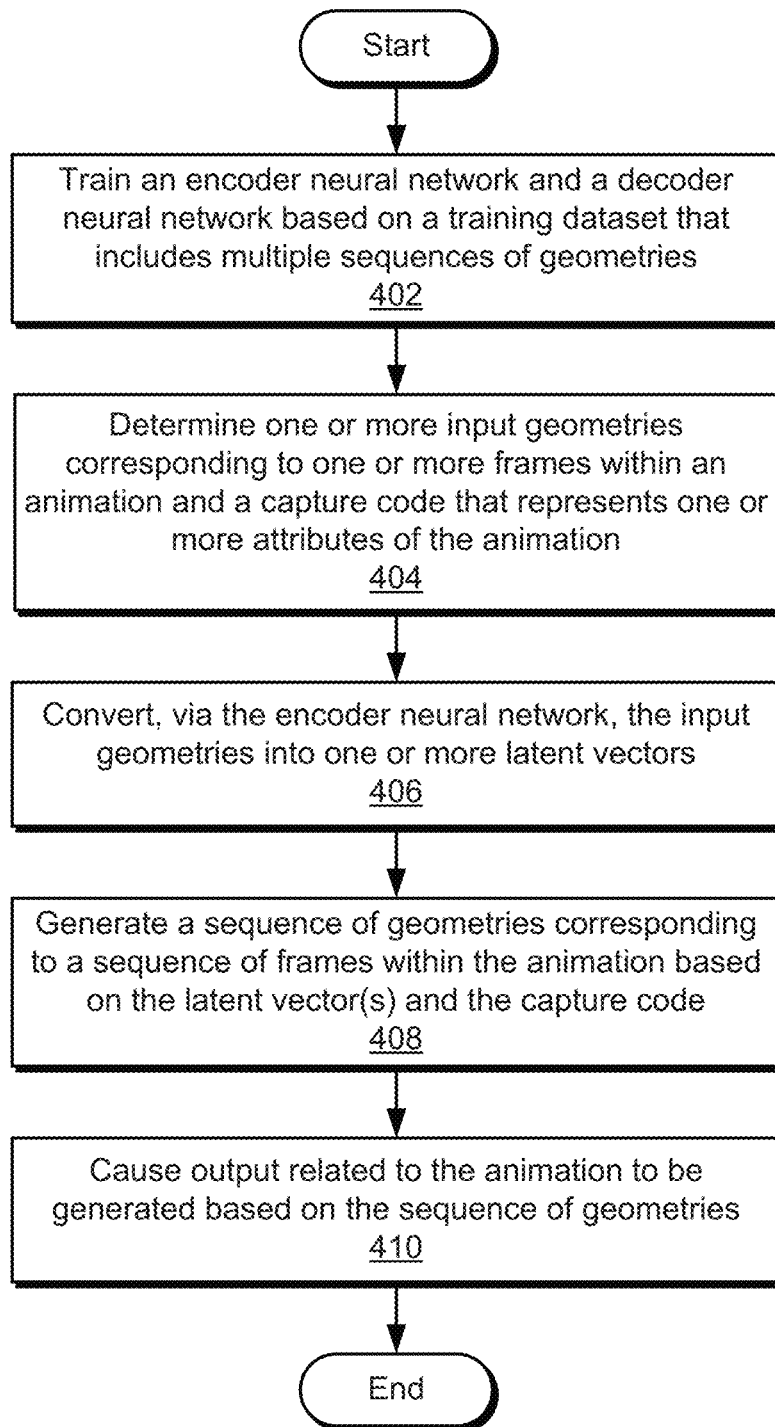
FIG. 4 is a flow diagram of method steps for synthesizing a sequence of 3D geometries, according to various embodiments.

FIG. 4 is a flow diagram of method steps for synthesizing a sequence of 3D geometries, according to various embodiments. Although the method steps are described in conjunction with the systems of FIGS. 1-3, persons skilled in the art will understand that any system configured to perform the method steps in any order falls within the scope of the present disclosure.

As shown, in step 402, training engine 122 trains an encoder neural network and a decoder neural network based on a training dataset that includes multiple sequences of geometries. For example, training engine 122 could sample one or more geometries from each sequence of geometries and input position-encoded representations of the sampled geometries into the encoder neural network. Training engine 122 could then train the encoder neural network and decoder neural network to generate the full sequence of geometries, given the position-encoded representations of the sampled geometries and a capture code representing the sequence of geometries. In another example, training engine 122 could train the encoder neural network and the decoder network with a discriminator neural network in an adversarial fashion.

Next, in step 404, execution engine 124 determines one or more input geometries corresponding to one or more frames within an animation and a capture code that represents one or more attributes of the animation. For example, execution engine 124 could receive the input geometries as one or more sets of blendshape weights from a user involved in generating the animation. Execution engine 124 could also receive, from the user, a selection of a capture code for an animation in the training dataset. Execution engine 124 could also, or instead, generate a new capture code by interpolating between two or more existing capture codes for two or more animations in the training dataset. In another example, execution engine 124 could omit receipt of the input geometries if the encoder and decoder neural networks have been trained (e.g., in an adversarial fashion) to generate an entire sequence of geometries without additional input.

In step 406, execution engine 124 converts, via the encoder neural network, the input geometries into one or more latent vectors. For example, execution engine 124 could generate one or more input representations by combining the input geometries with one or more encodings representing positions of the corresponding frames in the animation. Execution engine 124 could then apply a series of one or more encoder blocks to the input representation(s) to generate one or more corresponding latent vectors. If the encoder and decoder neural networks have been trained (e.g., in an adversarial fashion) to generate an entire sequence of geometries without receiving any input geometries, the encoder network can generate the latent vector(s) from one or more randomly generated or sampled values.

In step 408, execution engine 124 generates a sequence of geometries corresponding to a sequence of frames within the animation based on the latent vector(s) and the capture code. For example, execution engine 124 could generate multiple input representations based on the capture code and multiple encodings representing different positions of some or all frames within the animation. Execution engine 124 could then apply a series of one or more decoder blocks in the decoder neural network to the input representations and the latent vector(s) to generate the sequence of geometries.

In step 410, execution engine 124 causes output related to the animation to be generated based on the sequence of geometries. For example, execution engine 124 could store the sequence of geometries and/or corresponding input geometries in a training dataset for the encoder neural network, decoder neural network, and/or another machine learning model. In another example, execution engine 124 could transmit the sequence of geometries to an application or service that generates animations and/or other types of graphical or geometric output based on the sequence of geometries.

Execution engine 124 optionally repeats steps 404, 406, 408, and 410 to generate additional sequences of geometries. For example, execution engine 124 could perform steps 404, 406, 408, and 410 multiple times to generate multiple sequences of geometries for multiple corresponding sets of input geometries and/or multiple capture codes. Similarly, training engine 122 could repeat step 402 on a periodic basis and/or as additional training data for the encoder and decoder neural networks becomes available.

Synthesizing Animations from Sequences of 3D Geometries

Figure 5:
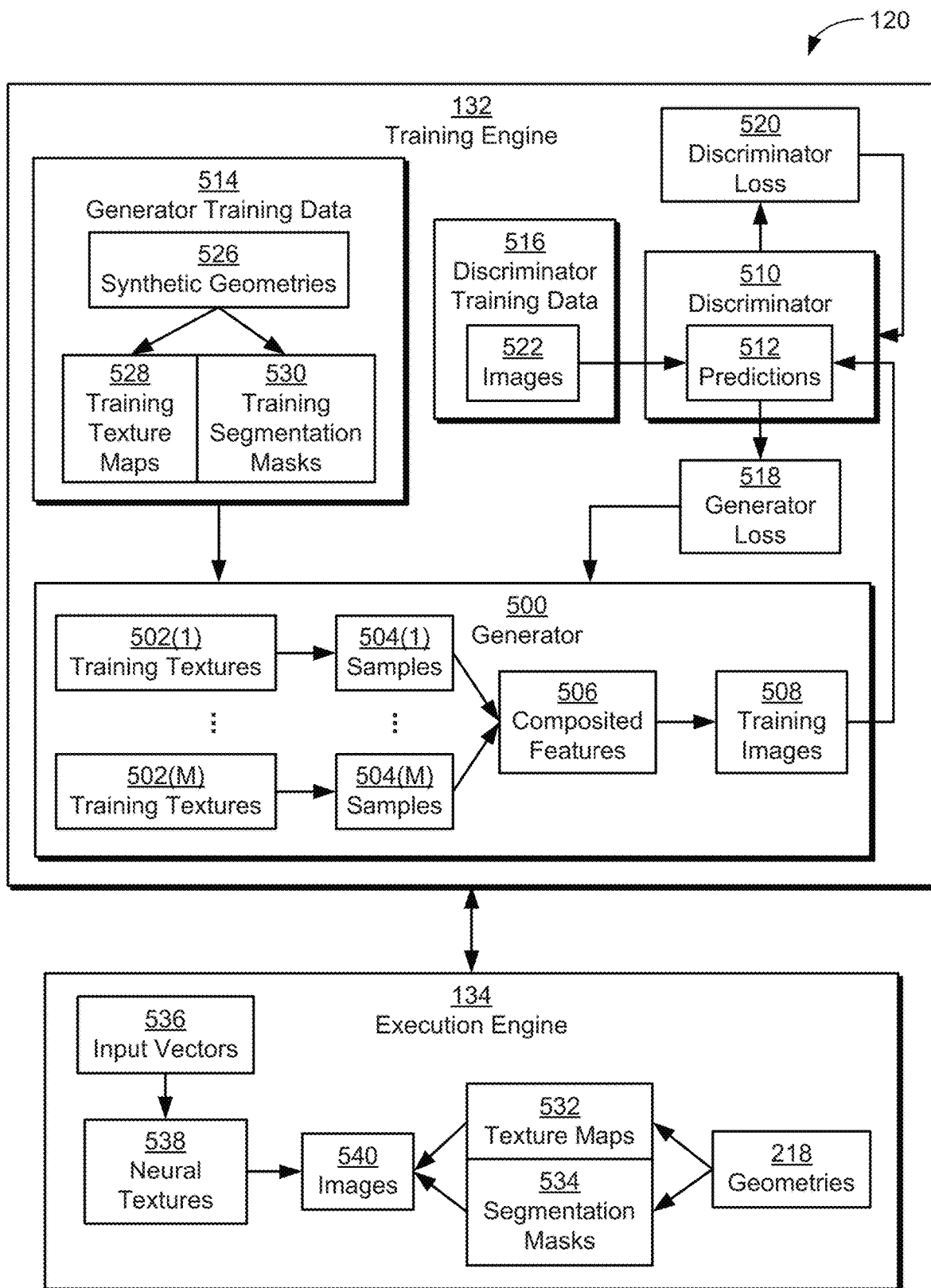
FIG. 5 is a more detailed illustration of the image synthesis module of FIG. 1, according to various embodiments.

FIG. 5 is a more detailed illustration of image synthesis module 120 of FIG. 1, according to various embodiments. As mentioned above, image synthesis module 120 is configured to train and execute one or more machine learning models that generate renderings of 3D geometries. More specifically, image synthesis module 120 can use a generator 500 to convert geometries 218 from geometry synthesis module 118 and/or another component into sequences of images 540 within the corresponding performances. Image synthesis module 120 can also, or instead, use generator 500 to generate individual images 540 from the corresponding geometries 218 independent of any sequences, animations, or performances to which geometries 218 may pertain.

In one or more embodiments, generator 500 includes components that generate neural textures 538, given input vectors 536 that are sampled from one or more distributions. In some embodiments, neural textures 538 include representations of textures that are generated by one or more neural network layers for one or more portions of a 3D geometry (e.g., geometries 218). These neural textures 538 are combined with one or more texture maps 532 and/or one or more segmentation masks 534 that are generated from the 3D geometry to form an image (e.g., images 540) that corresponds to a rendering of the 3D geometry.

Figure 6A:
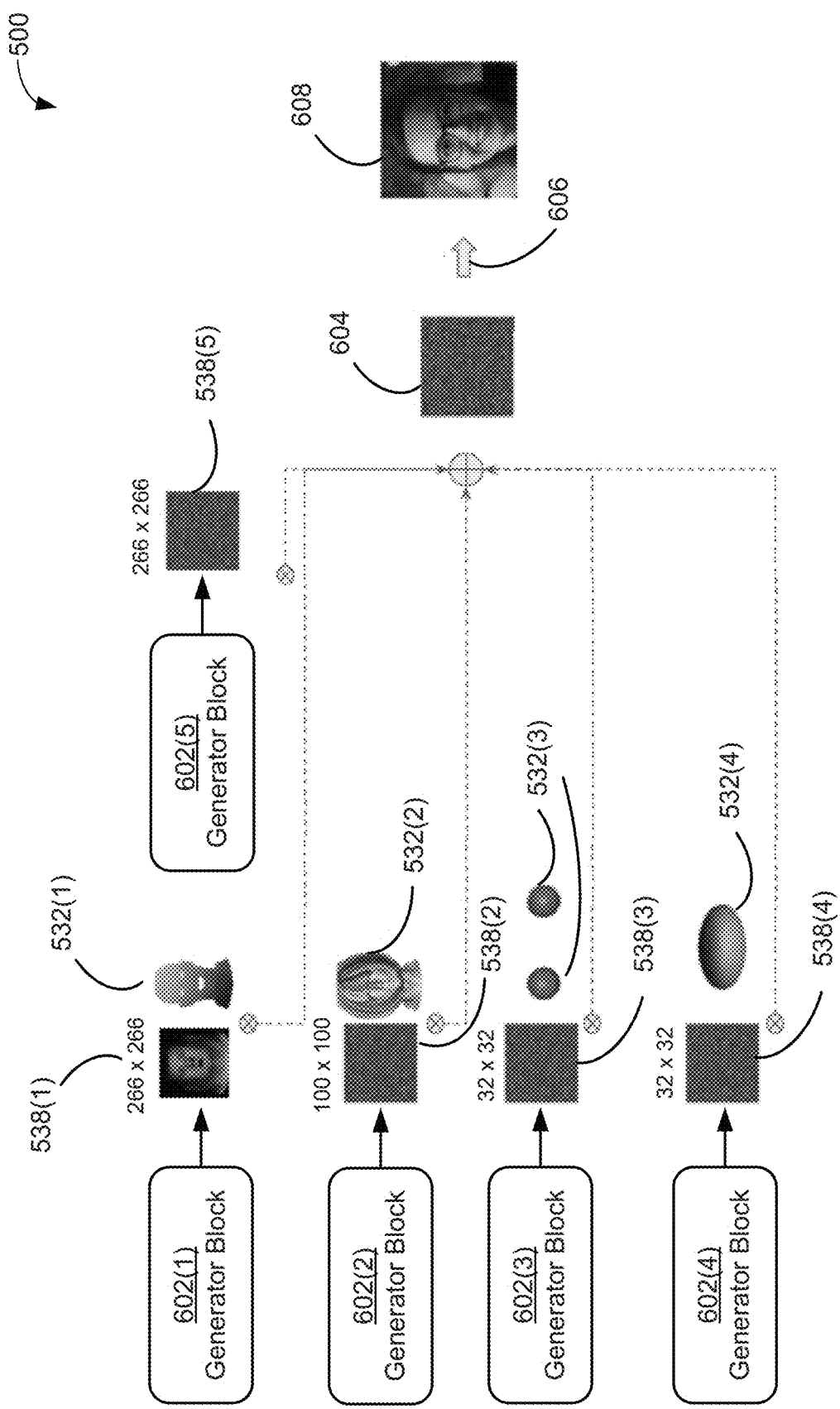
FIG. 6A illustrates an exemplar architecture for the generator of FIG. 6A, according to various embodiments.

FIG. 6A illustrates an exemplar architecture for generator 500 of FIG. 5, according to various embodiments. As shown in FIG. 6A, the exemplar architecture for generator 500 includes a number of generator blocks 602(1)-602(5), each of which is referred to individually as generator block 602.

Generator blocks 602(1)-602(5) operate in parallel to generate multiple sets of "unwrapped" neural textures 538(1)-538(5) for different portions of a 3D geometry. In the example of FIG. 6A, generator block 602(1) is used to generate neural texture 538(1) for a skin portion of a face geometry, generator block 602(2) is used to generate neural texture 538(2) for a hair portion of the face geometry, generator block 602(3) is used to generate neural texture 538(3) for an eye portion of the face geometry, generator block 602(4) is used to generate neural texture 538(4) for an inner mouth portion of the face geometry, and generator block 602(5) is used to generate neural texture 538(5) for a background portion of the face geometry.

In some embodiments, each generator block 602 includes a structure that is similar to that of a Style Generative Adversarial Network (StyleGAN), StyleGAN2 model, and/ or another type of generative neural network. Input vectors 536 for each generator block 602 can include a latent code w, which is produced by a mapping network in the Style-GAN or StyleGAN2 model from a sample z from a distribution of latent variables learned by the mapping network. Input vectors 536 for each generator block 602 can also include one or more noise vectors that are sampled from Gaussian distributions. Each noise vector can be added to the output of a corresponding convolutional layer in generator block 602 to produce a corresponding neural texture 538 in a parameterized UV texture space that corresponds to a known 3D model (e.g., a face).

After neural textures 538(1)-538(5) are generated by the corresponding generator blocks 602(1)-602(5), each set of neural textures 538(1)-538(5) is sampled using a texture map 532(1)-538(5) for the corresponding portion of the 3D geometry to produce multiple sets of "screen-space" neural features. In some embodiments, screen-space neural features refer to neural textures 538 that have been mapped onto pixel locations in the "screen space" of an output image that is used to render the 3D geometry. For example, UV-space neural textures 538(1) could be sampled using texture map 532(1) for a skin portion of a face geometry to produce a screen-space rendering of the neural features for the skin portion. UV-space neural textures 538(2) could be sampled using texture map 532(2) for a hair portion of the face geometry to produce a screen-space rendering of the neural features for the hair portion. UV-space neural textures 538(3) could be sampled using texture map 532(3) for an eye portion of the face geometry to produce a screen-space rendering of the neural features for the eye portion. UV-space neural textures 538(4) could be sampled using texture map 532(4) for an inner mouth portion of the face geometry to produce a screen-space rendering of the neural features for the inner mouth portion. UV-space neural textures 538(5) could be sampled using texture map 532(5) for a background portion of the face geometry to produce a screen-space rendering of the neural features for the background portion.

The screen-space neural features for the skin, hair, eyes, inner mouth, and background portions are composited using a segmentation mask (e.g., segmentation masks 534) to produce composited screen-space neural features 604. For example, the segmentation mask could be used by one or more layers of generator 500 to arrange and/or layer the screen-space neural features for the skin, hair, eyes, inner mouth, and background within a single screen-space "image." One or more convolutional layers 606 in generator 500 are then used to convert the composited screen-space neural features 604 into a photorealistic rendered image 608 that includes RGB pixel values and corresponds to a rendered pose of the face geometry.

Figure 6B:
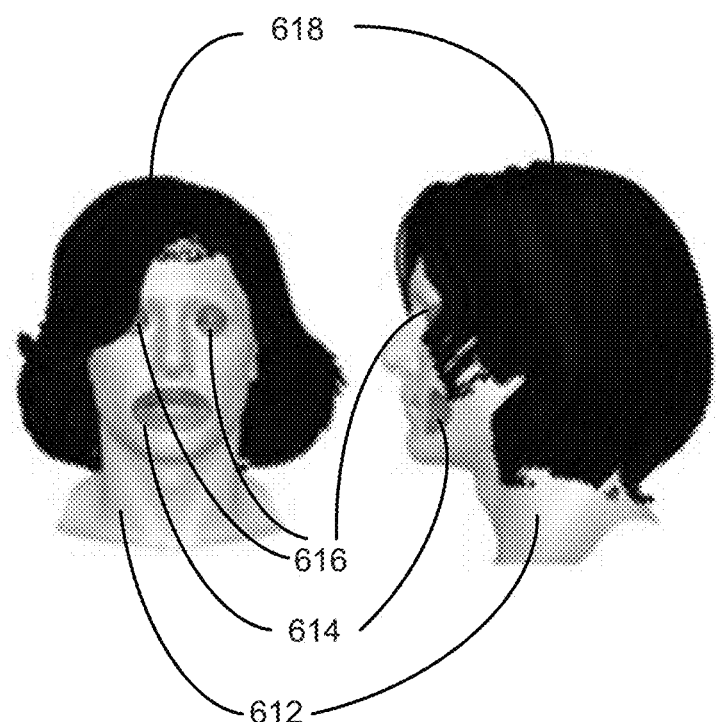
FIG. 6B illustrates components of a face model that are used with the generator of FIG. 6A, according to various embodiments.

FIG. 6B illustrates components 612, 614, 616, and 618 of a face model that are used with the exemplar generator 500 of FIG. 6A, according to various embodiments. As shown in FIG. 6B, the face model includes a skin component 612, a mouth component 614, an eye component 616, and a hair component 618. Skin component 612 can include a mesh that denotes the 3D shape of the face model that is covered by skin. Mouth component 614 can approximate an inner mouth in the face model as a plane. Eye component 616 can approximate one or more eyes in the face model using spheres. Hair component 618 can include a hairstyle that is composed of thousands of hair strands.

In one or more embodiments, components 612, 614, 616, and 618 are assembled within the face model and rendered to produce corresponding texture maps 532 that are used to sample UV-space neural textures 538. More specifically, a template for the face model can be deformed to match the identity and expression of an input face geometry. The deformed face model is then posed and rendered to produce texture maps 532 and a segmentation mask for the input face geometry. For example, component 612 in the deformed face model could be used to render texture map 532(1) associated with the skin in the face geometry. Component 618 in the deformed face model could be used to render texture map 532(2) associated with the hair in the face geometry. Component 616 in the deformed face model could be used to render texture map 532(3) associated with the eyes in the face geometry. Component 614 in the deformed face model could be used to render texture map 532(4) associated with the inner mouth in the face geometry. Finally, texture map 532(5) associated with the background of the face geometry could be parameterized and rendered using a plane.

Figure 6C:
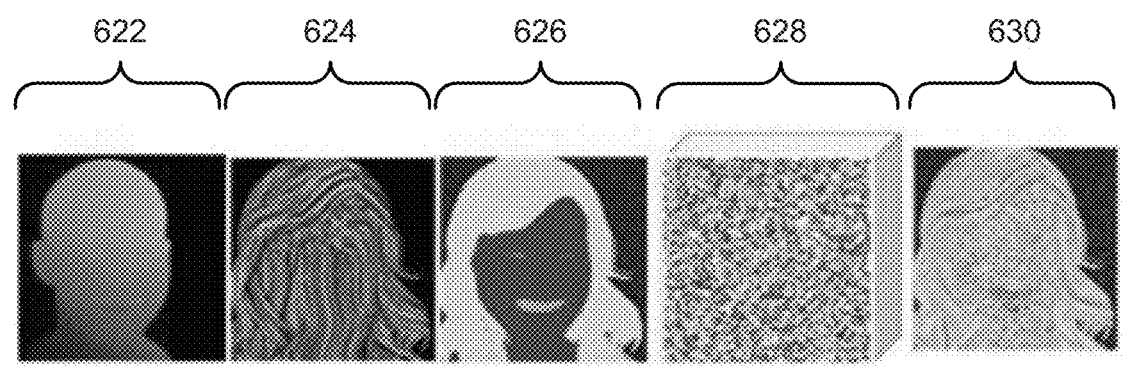
FIG. 6C illustrates a number of maps that are used to sample and composite neural features from the generator of FIG. 5, according to various embodiments.

FIG. 6C illustrates a number of maps 622 624, 626, 628, and 630 that are used to sample and composite neural textures 538 from the exemplar generator 500 of FIG. 6A, according to various embodiments. As shown in FIG. 6C, map 622 includes a texture map of the skin, eyes, and inner mouth in a face geometry, and map 624 includes a texture map of the hair in the face geometry. Maps 622 and 624 can be generated by posing and rendering components 612, 614, 616, and 618 of a deformed face model, as described above with respect to FIG. 6B.

Map 626 includes a segmentation mask of the face geometry, and maps 628 include intermediate neural textures 538 for various components of the face geometry. Map 626 can also be generated by rendering the deformed face model in a certain pose, and maps 628 can be generated by individual generator blocks 602 in generator 500.

Finally, map 630 includes composited screen-space neural features 604 for the face geometry. Map 630 can be generated by sampling neural textures 538 in maps 628 using the corresponding texture maps 622 and 624 and assembling and layering the sampled neural textures 538 using the segmentation mask in map 626.

While the operation of generator 500 has been discussed with respect to FIGS. 6A-6C in the context of face geometries and face models, those skilled in the art will appreciate that generator 500 can be used to perform rendering of other types of objects and/or geometries. For example, generator blocks 602 could be used to generate neural textures 538 for various body parts of a human or animal. These neural textures 538 could be combined with texture maps 532 for the same body parts to generate screen-space neural features for each of the body parts. A segmentation mask of the body parts could then be used to composite the screen-space neural features, and one or more convolutional layers 606 in generator 500 could be used to convert the composited screen-space neural features 604 into a rendered image 608 of the human or animal.

Returning to the discussion of FIG. 5, training engine 132 trains generator 500 using generator training data 514 that includes training texture maps 528 and training segmentation masks 530 associated with a number of synthetic geometries 526. Synthetic geometries 526 include 3D models of synthetic objects that are similar to objects for which images 540 are to be generated. For example, synthetic geometries 526 could include full-head 3D models of synthetic faces. Training engine 132 and/or another component could generate each synthetic face by randomizing the identity, expression, hairstyle, and/or pose of a parametric face model, such as the face model of FIG. 6B. The component could then generate one or more training texture maps 528 and/or one or more training segmentation masks 530 for each synthetic face by posing and rendering the corresponding face model, as described above with respect to FIGS. 6B-6C.

During training of generator 500, training engine 132 uses generator blocks 602 and/or other components of generator 500 to generate training textures 502(1)-502(M) for various portions of a given synthetic geometry in generator training data 514, where M is an integer greater than one. Next, training engine 132 uses training texture maps 528 for the synthetic geometry to generate screen-space samples 504(1)-504(M) of training textures 502(1)-502(M). Training engine 132 also uses one or more training segmentation masks 530 for the synthetic geometry to generate composited features 506 that include samples 504 that are arranged and/or layered within a single screen-space "image." Training engine 132 then uses one or more convolutional layers 606 in generator 500 to convert composited features 506 into a training image (e.g., training images 508) in RGB space.

In one or more embodiments, training engine 132 updates parameters of generator 500 based on predictions 512 outputted by a discriminator 510 from training images 508. As shown in FIG. 5, input into discriminator 510 includes training images 508 produced by generator 500 from generator training data 514, as well as images 522 from discriminator training data 516 for discriminator 510. For example, training images 508 could include images of faces that are rendered by generator 500 using training textures 502, samples 504, and composited features 506, and images 522 could include photographs of faces.

For a given input image, discriminator 510 generates a prediction that classifies the input image as produced by generator 500 or as coming from discriminator training data 516. Discriminator 510 is trained using a discriminator loss 520 that is calculated based on differences between predictions 512 and the actual classes to which the corresponding input images belong. After parameters of discriminator 510 have been updated over one or more epochs, training engine 132 can train generator 500 based on a generator loss 518 that is calculated based on the frequency with which discriminator 510 incorrectly classifies training images 508 from generator 500 as coming from discriminator training data 516. After parameters of generator 500 have been updated over one or more epochs, training engine 132 can resume training discriminator 510 using additional training images 508 produced by generator 500. In other words, training engine 132 alternates between training of generator 500 and training of discriminator 510 until the predictive performance of discriminator 510 falls below a threshold and/or another stopping criterion is met.

After training of generator 500 is complete, execution engine 134 uses generator 500 to produce images 540 that correspond to renderings of geometries 218. For example, execution engine 134 could use generator 500 to generate images 540 that correspond to individual frames within a performance or animation, given geometries 218 for one or more objects to be rendered within the frames.

More specifically, execution engine 134 uses one or more input vectors 536 (e.g., latent and/or noise vectors) into generator 500 to produce a set of neural textures 538 for various portions of a given geometry. Execution engine 134 also generates texture maps 532 and one or more segmentation masks 534 for the same portions of the geometry. Execution engine 134 then uses texture maps 532 to sample neural textures 538 and uses segmentation masks 534 to composite the sampled neural textures 538 into a screen-space arrangement. Finally, execution engine 134 uses one or more convolutional layers and/or another component of generator 500 to convert the composited sampled textures 538 into a photorealistic image in RGB space.

Consequently, execution engine 134 can use generator 500 to produce images 540 of fixed geometries 218 and/or neural textures 538. More specifically, execution engine 134 can keep input vectors 536 fixed to generate the same neural textures 538 across multiple images 540. During rendering of images 540, these neural textures 538 can be combined with texture maps 532 and segmentation masks 534 for a sequence of geometries 218 to generate an animation of one or more objects represented by geometries 218. Conversely, multiple images 540 with different textures applied to the same geometry can be generated by sampling different input vectors 536 that are then mapped to different sets of neural textures 538 by generator 500 and combining each set of neural textures 538 with the same texture maps 532 and segmentation masks 534 for the geometry into a rendered image.

While the operation of training engine 132 and execution engine 134 has been described with respect to generator 500, those skilled in the art will appreciate that other techniques can be used to by training engine 132, execution engine 134, and/or other components to convert geometries 218 into photorealistic images 540 and/or animations. A number of these techniques are described below with respect to FIGS. 7 and 8.

Figure 7:
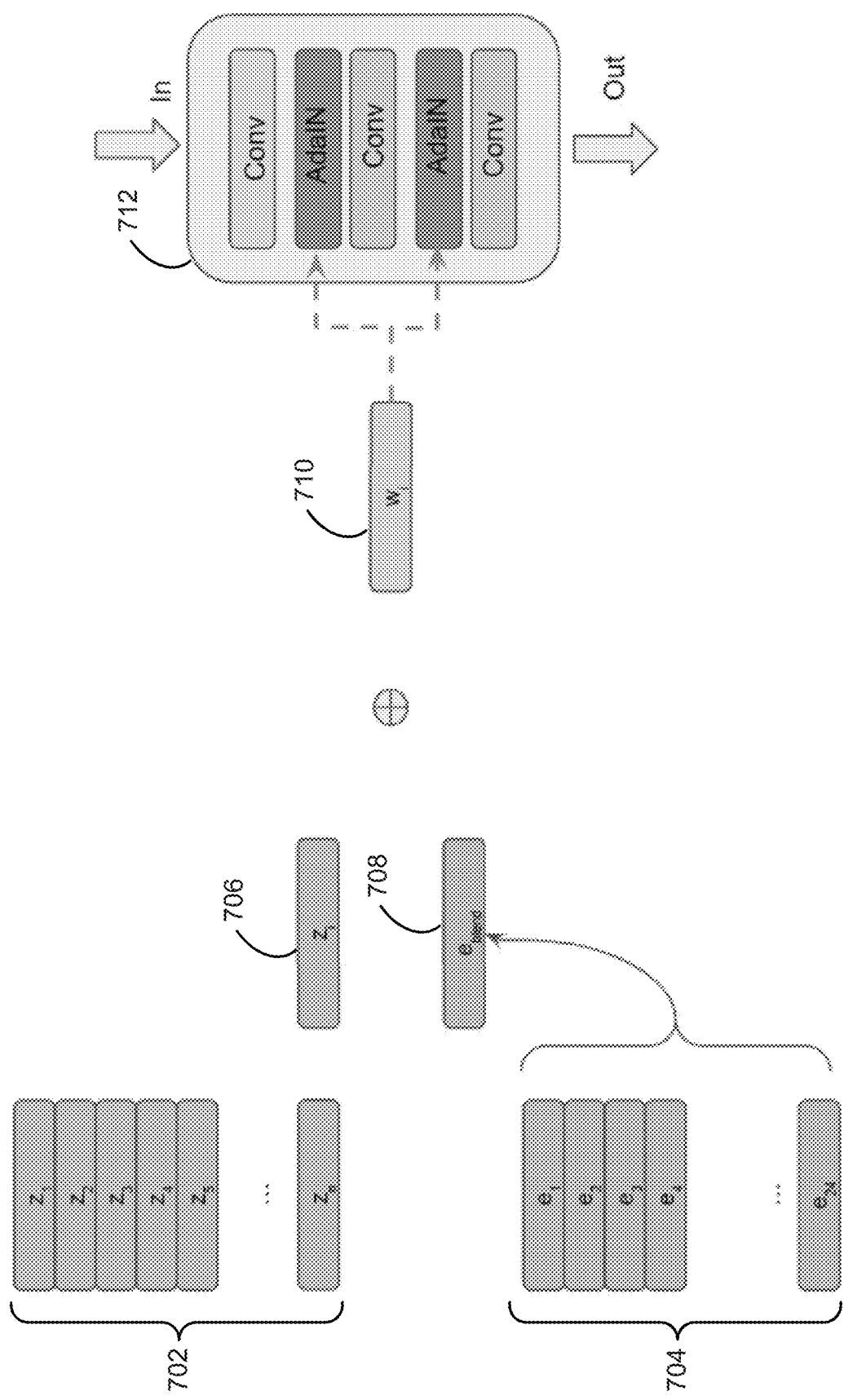
FIG. 7 illustrates a technique for generating a sequence of images, given input that includes representations of geometries to be rendered in the sequence of images.

FIG. 7 illustrates a technique for generating a sequence of images, given input that includes representations of geometries to be rendered in the sequence of images. More specifically, FIG. 7 illustrates the use of a generative model to generate images that correspond to an animation, given two sets of styles 702 and 704 associated with the images.

In one or more embodiments, the generative model includes a StyleGAN, StyleGAN2, and/or another type of style-based generative model. Input into the style-based generative model includes a latent vector 710 $w_i$ that is mapped to a photorealistic image by the style-based generative model.

To gain control of the expression associated with a face (or another object) to be rendered by the generative model, latent vector 710 is divided into two components 706 and 708:

$$w=[z,e] \quad (4)$$

In the above equation, the "z" component 706 corresponds to an "identity" style that represents an identity, hairstyle, lighting, and/or other attributes that affect the appearance of the face within an image. On the other hand, the "e" component 708 corresponds to an "expression" style that controls the expression on the face. The "e" component 708 can include blendshape coefficients and/or other representations of the expression that are generated by transformer 200. These blendshape coefficients and/or representations in the "e" component 708 are concatenated with the "z" component 706 and converted by a mapping network in the generative model into the "w" latent vector 710. The "w" latent vector 710 is then used to control adaptive instance normalization performed by a block 712 in a synthesis network within the generative model.

In some embodiments, the generative model is trained using a training dataset that includes images of the same identities and multiple expressions, as well as expression (e.g., blendshape) coefficients for each of the expressions. For example, the training dataset can include "n" identity styles 702 corresponding to "n" unique identities and as many expression styles 704 as there are expression coefficients. For each image in the training dataset, a concatenation of the "z" component 706 representing the identity style of the image and the "e" component 708 representing the expression style of the image is fed into the mapping network to generate latent vector 710. The generative model is then trained in a supervised fashion to reduce an error between the image generated by the generative model from latent vector 710 and the corresponding image in the training dataset that is represented by the "z" and "e" components 706 and 708. The generative model can also be trained in an adversarial fashion with a discriminator to encourage realistic synthesis of random expression styles.

The technique of FIG. 7 can additionally be used to control other aspects of a rendered image. For example, latent vector 710 could be divided into components that represent lighting, pose, age, background, accessories, proportions, and/or other attributes related to the appearance of a face (or another object) in an image produced by the generative model. Training data that includes images of the same identities, variations in these attributes, and distinct coefficients or values that represent these variations in attributes could be used to train the generative model. The trained generative model could then be used to generate images of specific identities and/or attributes.

Figure 8:
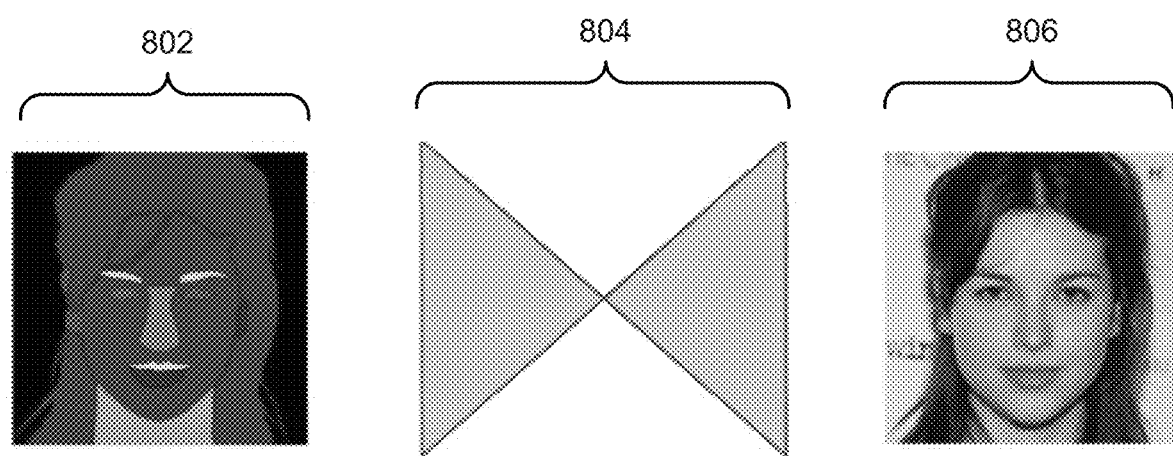
FIG. 8 illustrates a technique for generating a sequence of images, given input that includes representations of geometries to be rendered in the sequence of images.

FIG. 8 illustrates a technique for generating a sequence of images, given input that includes representations of geometries to be rendered in the sequence of images. As shown in FIG. 8, a geometry of a face (or another object) is represented using a segmentation mask 802 of the face. For example, segmentation mask 802 could be generated from a 3D geometry of the face using the technique described above with respect to FIG. 6B.

Segmentation mask 802 is inputted into a convolutional neural network (CNN) 804 that performs image-to-image translation. In particular, CNN 804 converts segmentation mask 802 into a photorealistic image 806 of a corresponding face (or object). To ensure that a sequence of geometries 218 is rendered using the same identity, CNN 804 can include a mechanism for controlling the style of the outputted image 806 and/or individual semantic regions in image 806.

For example, CNN 804 could include a number of semantic region-adaptive normalization (SEAN) blocks. An RGB image and a corresponding segmentation mask could be inputted into a SEAN encoder in CNN 804 to generate styles for individual semantic regions in segmentation mask 804. The styles could be inputted into a SEAN decoder in CNN 804, along with another segmentation mask 802 that controls the spatial layout of the resulting image 806. As a result, an image that corresponds to a rendering of a single geometry in the sequence can be inputted with the corresponding segmentation mask to generate a set of styles that represent the identity of the corresponding face (or object). The same set of styles can then be used with additional segmentation masks for other geometries in the sequence to generate a corresponding sequence of images within a performance or animation involving the face (or object).

Figure 9:
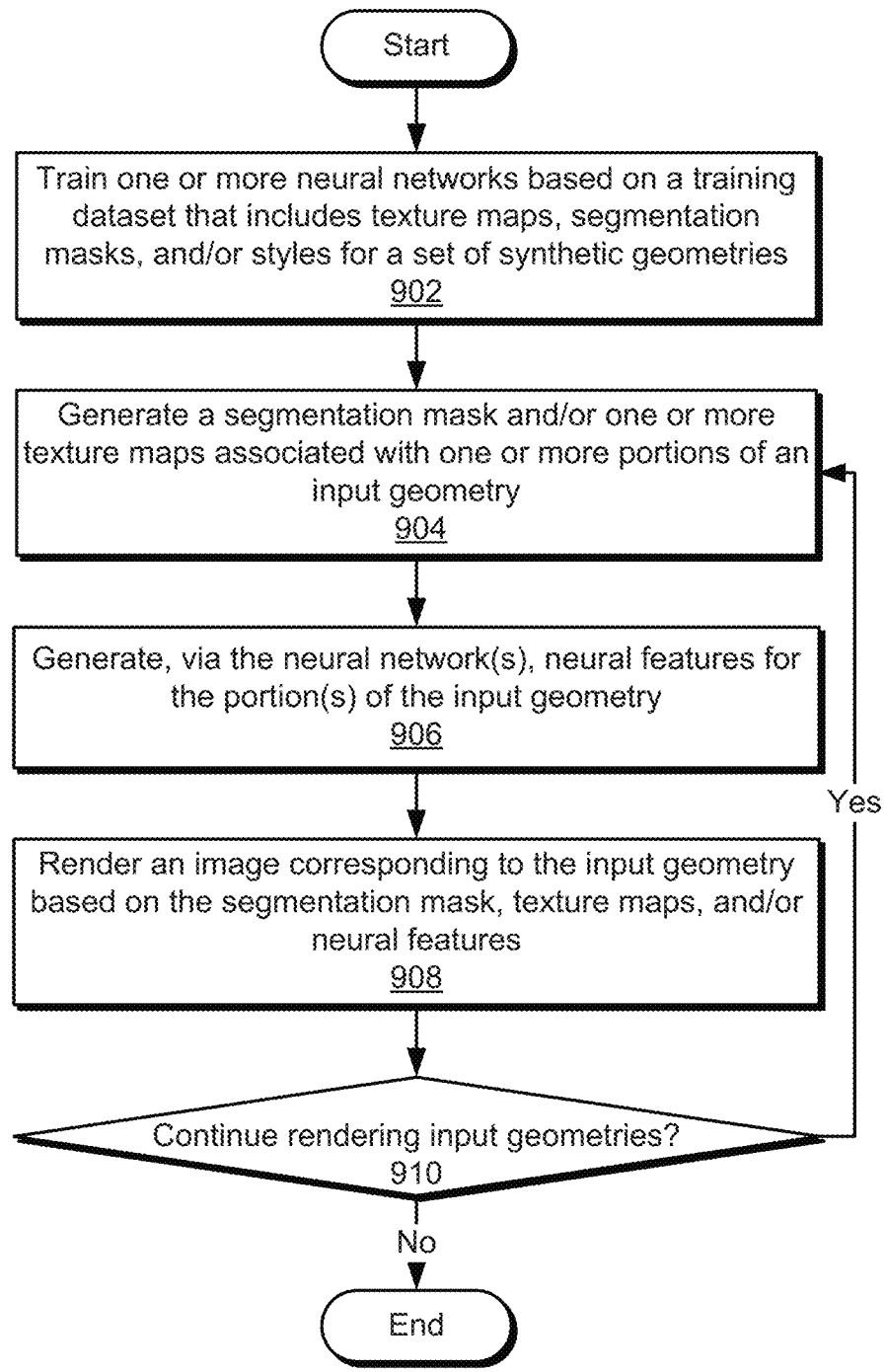
FIG. 9 is a flow diagram of method steps for synthesizing a sequence of images corresponding to a movement-based performance, according to various embodiments.

FIG. 9 is a flow diagram of method steps for synthesizing a sequence of images corresponding to a movement-based performance, according to various embodiments. Although the method steps are described in conjunction with the systems of FIGS. 1 and 5-8, persons skilled in the art will understand that any system configured to perform the method steps in any order falls within the scope of the present disclosure.

As shown, in step 902, training engine 132 trains one or more neural networks based on a training dataset that includes texture maps, segmentation masks, and/or styles for a set of synthetic geometries. For example, training engine 132 could train a generator neural network and/or an image-to-image translation network to generate RGB images of each synthetic geometry, given the corresponding texture maps, segmentation masks, and/or a set of blendshape coefficients representing an "expression" style associated with the synthetic geometry. Training engine 132 could also, or instead, train the generator neural network and/or image-to-image translation network in an adversarial fashion based on predictions generated by a discriminator neural network from images produced by the generator neural network and/or the image-to-image translation network.

Next, in step 904, execution engine 134 generates a segmentation mask and/or one or more texture maps associated with one or more portions of an input geometry. For example, execution engine 134 could deform various portions of a parametric 3D model to match the input geometry. Execution engine 134 could then pose and render the deformed 3D model to generate the texture map(s) and/or segmentation mask.

In step 906, execution engine 134 generates, via the neural network(s), neural features associated with the portion(s) of the input geometry. In a first example, execution engine 134 could use a set of generator blocks in a generator neural network to generate a different set of neural textures for each texture map produced in step 904. In a second example, execution engine 134 could use an encoder in the image-to-image translation network to generate a set of styles for individual semantic regions in a segmentation mask, given the segmentation mask and a corresponding RGB image. In a third example, execution engine 134 could use a mapping network in a generative neural network to convert one or more vectors representing various types of styles associated with the input geometry into a latent vector.

In step 908, execution engine 134 renders an image corresponding to the input geometry based on the segmentation mask, texture maps, and/or neural features. Continuing with the first example, execution engine 134 could use the texture maps to sample the corresponding neural textures generated by the generator blocks. Execution engine 134 could also use the segmentation mask to generate a composited set of screen-space neural features from the sampled neural textures. Execution engine 134 could then use one or more convolutional layers in the generator neural network to convert the composited screen-space neural features into an RGB image.

Continuing with the second example, execution engine 134 could input the styles generated by the encoder for the semantic regions in a first segmentation mask into a decoder in the image-to-image translation network. Execution engine 134 could also input a second segmentation mask that controls the spatial layout of the image into the decoder. The decoder could then generate an image that includes the spatial layout of the segmentation mask and the styles generated by the encoder for the corresponding semantic regions.

Continuing with the third example, execution engine 134 could input the latent vector generated by the mapping network into a synthesis network in the same generative neural network. In response to the inputted latent vector, the synthesis network could generate an image that adheres to the styles represented by the vector(s) used to generate the latent vector.

At step 910, execution engine 134 determines whether or not to continue rendering input geometries. For example, execution engine 134 could continue rendering a sequence of images that depicts a given performance until all input geometries corresponding to frames in the entire performance have been rendered or animated. While input geometries are to be rendered, execution engine 134 repeats steps 904, 906, and 908 to convert the input geometries into images. After the entire sequence of images has been rendered, execution engine 134 may discontinue processing related to input geometries associated with the sequence.

In sum, the disclosed techniques utilize a number of machine learning models to generate sequences of geometries and/or images that correspond to frames within a movement-based performance. First, a transformer is used to generate a sequence of geometries, given one or more input geometries that correspond to one or more keyframes within the performance. An encoder in the transformer converts the input geometries into latent vectors that encode the input geometries and the positions of the keyframes associated with the input geometries. A decoder in the transformer uses the latent vectors and a capture code representing a style, identity, semantics, and/or other attributes of the performance to generate the sequence of geometries. Within the sequence of geometries, geometries that correspond to keyframes in the performance are set to the input geometries and/or are generated to reflect the input geometries.

Next, each geometry generated by the transformer is converted into a rendered image using one or more neural networks. The neural network(s) can include a generator neural network that includes multiple parallel generator blocks. Each generator block produces a set of intermediate neural textures for a corresponding portion of the geometry. The neural textures are combined with texture maps generated from a rendering of the geometry to produce screen-space neural textures. A segmentation mask that is generated using the same rendering of the geometry is then used to composite the screen-space neural textures into a single "image," and one or more convolutional layers in the generator neural network are used to convert the composited screen-space neural textures into an RGB image of the geometry.

The neural network(s) can also, or instead, include a generator neural network that is trained to generate an image that adheres to one or more specific types of styles, given a latent vector that encodes the style(s). The latent vector can be generated by a mapping network in the generator neural network from a concatenation of one or more components representing the style(s). Multiple latent vectors associated with the same "identity" style and different "expression" styles can then be inputted into a synthesis network in the generator neural network to produce a sequence of images with the same identity and different expressions.

The neural network(s) can also, or instead, include an image-to-image translation network that converts a segmentation map of a geometry into a RGB image. The image-to-image translation network includes an encoder that generates a set of styles for individual semantic regions in a segmentation mask, given the segmentation mask and a corresponding RGB image. The image-to-image translation network also includes a decoder that generates an image based on the styles outputted by the encoder and a different segmentation mask that controls the spatial layout of the image. The image-to-image translation network can thus be used to generate an animation that includes a sequence of images that vary in spatial layout but have semantic regions that share the same set of styles.

One technical advantage of the disclosed techniques relative to the prior art is that one or more components of a realistic performance can be generated by a machine learning model that is trained using synthetic data. Accordingly, the disclosed techniques avoid time and resource overhead involved in collecting or capturing "real world" training data for machine learning models that generate sequences of geometries or images of entities based on input images of the same entities. Another technical advantage of the disclosed techniques is the generation of more realistic movement-based performances, compared with conventional approaches that use machine learning models to generate individual "static" representations of faces or other entities. These technical advantages provide one or more technological improvements over prior art approaches.

1. In some embodiments, a computer-implemented method for rendering an input geometry comprises generating a first segmentation mask for a first input geometry and a first set of texture maps associated with one or more portions of the first input geometry, generating, via one or more neural networks, a first set of neural textures for the one or more portions of the first input geometry, and rendering a first image corresponding to the first input geometry based on the first segmentation mask, the first set of texture maps, and the first set of neural textures.

2. The computer-implemented method of clause 1, further comprising training the one or more neural networks based on a training dataset that includes a plurality of texture maps and a plurality of segmentation masks for a plurality of synthetic geometries.

3. The computer-implemented method of clauses 1 or 2, further comprising training the one or more neural networks based on one or more predictions generated by a discriminator neural network from one or more images produced by the one or more neural networks.

4. The computer-implemented method of any of clauses 1-3, wherein generating the first segmentation mask and the first set of texture maps comprises deforming a template mesh to match the first input geometry, and generating the first segmentation mask and the first set of texture maps based on a pose associated with the first input geometry.

5. The computer-implemented method of any of clauses 1-4, further comprising rendering a second image corresponding to a second input geometry based on a second segmentation mask for the second input geometry, a second set of texture maps for one or more portions of the second input geometry, and the first set of neural textures.

6. The computer-implemented method of any of clauses 1-5, wherein generating the first set of neural textures comprises inputting one or more sampled vectors into the one or more neural networks.

7. The computer-implemented method of any of clauses 1-6, wherein rendering the first image comprises sampling the first set of neural textures based on the first set of texture maps to generate a set of screen-space neural features, generating a composited set of screen-space neural features based on the first segmentation mask and the set of screen-space neural features, and applying one or more convolutional layers to the composited set of screen-space neural features to produce the first image.

8. The computer-implemented method of any of clauses 1-7, wherein the one or more neural networks comprise a generative neural network.

9. The computer-implemented method of any of clauses 1-8, wherein the input geometry comprises a face.

10. The computer-implemented method of any of clauses 1-9, wherein the one or more portions of the input geometry comprise at least one of a skin, a hair, one or more eyes, a mouth, or a background.

11. In some embodiments, one or more non-transitory computer readable media store instructions that, when executed by one or more processors, cause the one or more processors to perform the steps of generating one or more maps associated with one or more portions of a first input geometry, generating, via one or more neural networks, a first set of neural textures for the one or more portions of the first input geometry, and rendering a first image corresponding to the first input geometry based on the one or more maps and the first set of neural textures.

12. The one or more non-transitory computer readable media of clause 11, wherein the instructions further cause the one or more processors to perform the step of comprising training the one or more neural networks based on a training dataset that includes a plurality of maps for a plurality of synthetic geometries.

13. The one or more non-transitory computer readable media of clauses 11 or 12, wherein training the one or more neural networks comprises updating parameters of the one or more neural networks based on one or more predictions generated by a discriminator neural network from one or more images produced by the one or more neural networks.

14. The one or more non-transitory computer readable media of any of clauses 11-13, wherein generating the one or more maps comprises deforming a template mesh to match the first input geometry, and generating a segmentation mask and a set of texture maps based on a pose associated with the first input geometry.

15. The one or more non-transitory computer readable media of any of clauses 11-14, wherein the instructions further cause the one or more processors to perform the step of rendering a second image corresponding to the first input geometry based on the one or more maps and a second set of neural textures for the one or more portions of the first input geometry.

16. The one or more non-transitory computer readable media of any of clauses 11-15, wherein generating the first set of neural textures comprises inputting one or more sampled vectors into the one or more neural networks.

17. The one or more non-transitory computer readable media of any of clauses 11-16, wherein rendering the first image comprises sampling the first set of neural textures based on a first set of texture maps included in the one or more maps to generate a set of screen-space neural features, generating a composited set of screen-space neural features based on a first segmentation mask included in the one or more maps and the set of screen-space neural features, and applying one or more convolutional layers to the composited set of screen-space neural features to produce the first image.

18. The one or more non-transitory computer readable media of any of clauses 11-17, wherein the first input geometry comprises a face.

19. The one or more non-transitory computer readable media of any of clauses 11-18, wherein the one or more maps comprises at least one of a skin texture map, a hair texture map, an eye texture map, a mouth texture map, or a background texture map.

20. In some embodiments, a system comprises one or more memories that store instructions, and one or more processors that are coupled to the one or more memories and, when executing the instructions, are configured to generate a first segmentation mask for a first input geometry and a first set of texture maps associated with one or more portions of the first input geometry, generate, via one or more neural networks, a first set of neural textures for the one or more portions of the first input geometry, and render a first image corresponding to the first input geometry based on the first segmentation mask, the first set of texture maps, and the first set of neural textures.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for rendering an input geometry, the computer-implemented method comprising:
    generating a first segmentation mask for a first input three-dimensional (3D) geometry and a first plurality of texture maps associated with a plurality of portions of the first input 3D geometry;
    generating, via execution of a plurality of generator blocks included in one or more neural networks, a first plurality of neural textures for the plurality of portions of the first input 3D geometry, wherein each generator block included in the plurality of generator blocks generates a neural texture for a different portion included in the plurality of portions of the first input 3D geometry, wherein portions of the first input 3D geometry corresponding to different generator blocks included in the plurality of generator blocks are non-overlapping; and
    rendering a first image corresponding to the first input 3D geometry based on the first segmentation mask, the first plurality of texture maps, and the first plurality of neural textures.

2. The computer-implemented method of claim 1, further comprising training the one or more neural networks based on a training dataset that includes a second plurality of texture maps and a plurality of segmentation masks for a plurality of synthetic geometries.

3. The computer-implemented method of claim 1, further comprising training the one or more neural networks based on one or more predictions generated by a discriminator neural network from one or more images produced by the one or more neural networks.

4. The computer-implemented method of claim 1, wherein generating the first segmentation mask and the first plurality of texture maps comprises:
    deforming a template mesh to match the first input 3D geometry; and
    generating the first segmentation mask and the first plurality of texture maps based on a pose associated with the first input 3D geometry.

5. The computer-implemented method of claim 1, further comprising rendering a second image corresponding to a second input geometry based on a second segmentation mask for the second input geometry, a second plurality of texture maps associated with a plurality of portions of the second input geometry, and the first plurality of neural textures.

6. The computer-implemented method of claim 1, wherein generating the first plurality of neural textures comprises, for each portion included in the plurality of portions of the first input 3D geometry:
    generating an input vector based on sampling a distribution of latent variables associated with the portion; and
    inputting the input vector into the generator block corresponding to the portion.

7. The computer-implemented method of claim 1, wherein rendering the first image comprises:
    sampling the first plurality of neural textures based on the first plurality of texture maps to generate a plurality of screen-space neural features;
    generating a composited set of screen-space neural features based on the first segmentation mask and the plurality of screen-space neural features; and
    applying one or more convolutional layers to the composited set of screen-space neural features to render the first image.

8. The computer-implemented method of claim 1, wherein the one or more neural networks comprise a generative neural network.

9. The computer-implemented method of claim 1, wherein the first input 3D geometry comprises a face.

10. The computer-implemented method of claim 1, wherein the plurality of portions of the first input 3D geometry comprises at least one of a skin, a hair, one or more eyes, a mouth, or a background.

11. One or more non-transitory computer readable media storing instructions that, when executed by one or more processors, cause the one or more processors to perform the steps of:
    generating one or more maps associated with a plurality of portions of a first input three-dimensional (3D) geometry;
    generating, via execution of a plurality of generator blocks included in one or more neural networks, a first plurality of neural textures for the plurality of portions of the first input 3D geometry, wherein each generator block included in the plurality of generator blocks generates a neural texture for a different portion included in the plurality of portions of the first input 3D geometry, wherein portions of the first input 3D geometry corresponding to different generator blocks included in the plurality of generator blocks are non-overlapping; and rendering a first image corresponding to the first input 3D geometry based on the one or more maps and the first plurality of neural textures.

12. The one or more non-transitory computer readable media of claim 11, wherein the instructions further cause the one or more processors to perform the step of training the one or more neural networks based on a training dataset that includes a plurality of maps associated with a plurality of synthetic geometries.

13. The one or more non-transitory computer readable media of claim 12, wherein training the one or more neural networks comprises updating parameters of the one or more neural networks based on one or more predictions generated by a discriminator neural network from one or more images produced by the one or more neural networks.

14. The one or more non-transitory computer readable media of claim 11, wherein generating the one or more maps comprises:
deforming a template mesh to match the first input 3D geometry; and
generating a segmentation mask and a set of texture maps based on a pose associated with the first input 3D geometry.

15. The one or more non-transitory computer readable media of claim 11, wherein the instructions further cause the one or more processors to perform the step of rendering a second image corresponding to the first input 3D geometry based on the one or more maps and a second set of neural textures for the plurality of portions of the first input 3D geometry.

16. The one or more non-transitory computer readable media of claim 11, wherein generating the first plurality of neural textures comprises:
generating one or more input vector based on sampling one or more distributions of latent variables associated with the plurality of portions;
executing a mapping network included in the one or more neural networks to convert one or more sampled vectors into one or more input vectors; and
executing the plurality of generator blocks to convert the one or more input vectors into the first plurality of neural textures.

17. The one or more non-transitory computer readable media of claim 11, wherein rendering the first image comprises:
sampling the first plurality of neural textures based on a first plurality of texture maps included in the one or more maps to generate a plurality of screen-space neural features;
generating a composited set of screen-space neural features based on a first segmentation mask included in the one or more maps and the plurality of screen-space neural features; and
applying one or more convolutional layers to the composited set of screen-space neural features to render the first image.

18. The one or more non-transitory computer readable media of claim 11, wherein the first input 3D geometry comprises a face.

19. The one or more non-transitory computer readable media of claim 11, wherein the one or more maps comprises at least one of a skin texture map, a hair texture map, an eye texture map, a mouth texture map, or a background texture map.

20. A system, comprising:
one or more memories that store instructions, and
one or more processors that are coupled to the one or more memories and,
when executing the instructions, are configured to:
generate a first segmentation mask for a first input three-dimensional (3D) geometry and a first plurality of texture maps associated with a plurality of portions of the first input 3D geometry;
generate, via execution of a plurality of generator blocks included in one or more neural networks, a first plurality of neural textures for the plurality of portions of the first input 3D geometry, wherein each generator block included in the plurality of generator blocks generates a neural texture for a different portion included in the plurality of portions of the first input 3D geometry, wherein portions of the first input 3D geometry corresponding to different generator blocks included in the plurality of generator blocks are non-overlapping; and
render a first image corresponding to the first input 3D geometry based on the first segmentation mask, the first plurality of texture maps, and the first plurality of neural textures.

* * * * *